United States Patent
Theis et al.

(10) Patent No.: US 12,523,323 B2
(45) Date of Patent: Jan. 13, 2026

(54) SEALING GROMMET ASSEMBLY

(71) Applicant: STABILUS GmbH, Koblenz (DE)

(72) Inventors: Christoph Theis, Hillscheid (DE);
Christian Einig, Brachtendorf (DE);
Kathrin Kronz, Mittelstrimmig (DE);
Axel Knopp, Eitelborn (DE); Jonathan Kessler, Großholbach (DE); Jan Bochen, Eitelborn (DE)

(73) Assignee: STABILUS GmbH, Koblenz (DE)

( * ) Notice: Subject to any disclaimer, the term of this patent is extended or adjusted under 35 U.S.C. 154(b) by 0 days.

(21) Appl. No.: 18/701,372

(22) PCT Filed: Nov. 22, 2022

(86) PCT No.: PCT/EP2022/082882
§ 371 (c)(1),
(2) Date: Apr. 15, 2024

(87) PCT Pub. No.: WO2023/094408
PCT Pub. Date: Jun. 1, 2023

(65) Prior Publication Data
US 2024/0360935 A1    Oct. 31, 2024

(30) Foreign Application Priority Data
Nov. 23, 2021    (DE) .................... 10 2021 130 679.5

(51) Int. Cl.
*F16L 37/08*    (2006.01)
*F16L 37/088*    (2006.01)
*F16L 37/12*    (2006.01)

(52) U.S. Cl.
CPC ............. *F16L 37/088* (2013.01); *F16L 37/12* (2013.01)

(58) Field of Classification Search
CPC ................................ F16L 37/12; F16L 37/088
See application file for complete search history.

(56) References Cited

U.S. PATENT DOCUMENTS 4,232,421 A * 11/1980 Tucker ................ B60R 16/0222
16/2.2
6,113,106 A * 9/2000 Dahlheimer .......... F04D 29/126
277/423
(Continued)

FOREIGN PATENT DOCUMENTS

DE    8915213 U1    2/1990
DE    20011757 U1    9/2000
(Continued)

OTHER PUBLICATIONS

International Search Report and Written Opinion received in Patent Cooperation Treaty Application No. PCT/EP2022/082882, mailed Feb. 17, 2023, 16 pages (original document written in the German language).

*Primary Examiner* — Christine M Mills
*Assistant Examiner* — L. Susmitha Koneru
(74) *Attorney, Agent, or Firm* — PatentXL Law Firm

(57) ABSTRACT

The invention relates to a sealing grommet arrangement comprising a sealing grommet (1) which is designed as a corrugated tube having a constant outer diameter over its length, one end of which grommet projects through an opening (12) in a housing wall (10), and on which grommet a retaining ring (6) for retaining the sealing grommet (1) on the housing wall (10) is positioned. The retaining ring projects, by means of the inner contour of its through-opening (7), radially inwards into a corrugation trough (2) of the sealing grommet (1), and can be connected to the housing wall (10) so as to close the opening (12) in the housing wall (10). The retaining ring (6) has a central through-opening (7), by means of the inner contour (8) of which the retaining ring (6) projects into a corrugation trough (2) of the sealing grommet (1), wherein the sealing grommet (1) consists of a material which is elastically deformable in such a way that the retaining ring (6) can be (Continued)

moved, by a certain minimum application of axial force, from one corrugation trough (2) into an adjacent corrugation trough (2) so as to elastically deform the sealing grommet (1).

6 Claims, 1 Drawing Sheet

(56) References Cited

U.S. PATENT DOCUMENTS

| 6,364,373 | B1 | 4/2002 | Brockway |
| 8,505,982 | B2 | 8/2013 | Lei et al. |
| 2020/0231102 | A1 | 7/2020 | Nakai |
| 2022/0049770 | A1* | 2/2022 | Nakai ................ H02G 3/22 |

FOREIGN PATENT DOCUMENTS

| DE | 102009009990 A1 | 8/2010 |
| DE | 102011085398 A1 | 5/2013 |
| JP | 3701909 B2 | 10/2005 |
| JP | 2022-70700 A | 5/2022 |
| WO | 2012074443 A1 | 6/2012 |

* cited by examiner

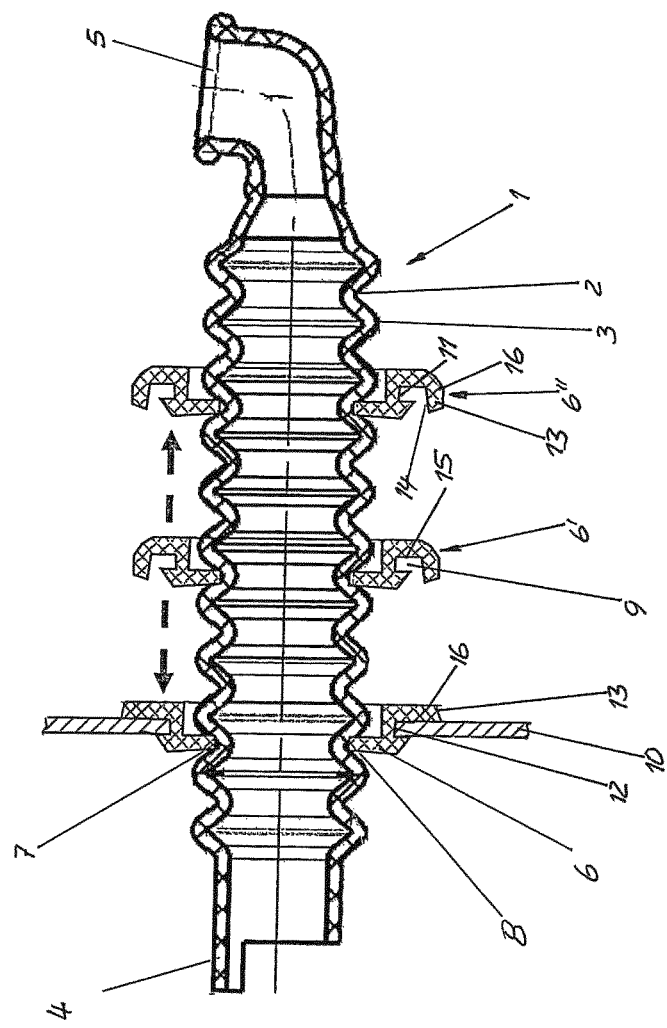

SEALING GROMMET ASSEMBLY

RELATED APPLICATION

This application is a national phase application of Patent Cooperation Treaty Application No. PCT/EP2022/082882 filed Nov. 22, 2022, which claims priority to German Application No. 102021130679.5 filed Nov. 23, 2021, both of which are incorporated herein by reference in their entirety.

The invention relates to a sealing grommet arrangement with a sealing grommet designed as a corrugated tube of constant external diameter over its length, one end of which projects through an opening in a housing wall and on which a retaining ring is arranged for holding the sealing grommet on the housing wall, which retaining ring projects radially inwards with a radially inner region into a corrugation trough of the sealing grommet and which retaining ring can be connected to the housing wall so as to close the opening in the housing wall.

In a sealing grommet arrangement of this type, it is known that a retaining ring with a locking lug engages in a corrugation trough of the corrugated tube and is connected to the housing wall and held in position by means of a retaining ring. This sealing grommet arrangement has a complex design and can only be fitted with considerable assembly effort.

The task of the invention is therefore to create a sealing grommet arrangement of the type mentioned above, which, with a simple structure and simple assembly, enables the same sealing grommet for different lengths of the sealing grommet projecting from the opening of the housing wall.

This task is solved in accordance with the invention in that the retaining ring has a central through-opening with the inner contour of which the retaining ring projects into a corrugation trough of the sealing grommet, the sealing grommet consisting of an elastically deformable material in such a way that the retaining ring can be moved from one corrugation trough into a neighbouring corrugation trough while elastically deforming the sealing grommet by applying a certain minimum axial force.

This design makes it possible to use one and the same sealing grommet for different required lengths of the sealing grommet protruding from the housing wall by moving the retaining ring on the sealing grommet into a corrugation trough corresponding to the desired length of the sealing grommet protruding from the opening in the housing wall. No additional components or special tools are required for this.

With the same grommet, the retaining ring can also be designed with a different outer diameter so that the same sealing grommet can be used for openings of different diameters in the housing wall.

This significantly reduces the storage and logistics costs for the grommets.

As the same sealing grommet can be used for different applications, only a single mould is required for its manufacture.

If the retaining ring is in contact with the inner contour of its through hole in the corrugation trough of the sealing grommet, the retaining ring is held on the sealing grommet without play.

The retaining ring can be arranged on the sealing grommet independently of its rotational position, making installation easier, if the through-opening of the retaining ring has a circular contour.

If the retaining ring is in contact with the inner contour of its through hole with preload on the outer contour of the corrugation trough, the retaining ring sits tightly on the sealing grommet.

The sealing grommet can have a gripping contour at one of its end regions, on which the sealing grommet can be gripped manually and subjected to axial force, for example.

This makes it possible to pull the retaining ring into the desired position on the sealing grommet by pulling on the gripping contour.

To secure the retaining ring to the housing wall, the outer radially surrounding region of the retaining ring can be provided with a connecting structure that can be connected to the housing wall.

In a simple design, the connecting structure can be a radially surrounding, radially outwardly open annular groove, which has a groove width corresponding to the wall thickness of the housing wall and a diameter at the bottom of the annular groove corresponding to the diameter of the opening in the housing wall.

If the retaining ring is made of an elastically deformable material and can be snapped into the opening in the housing wall with its annular groove, the retaining ring can be connected to the housing wall by simply snapping it into the opening in the housing wall.

If the retaining ring has a radially surrounding sealing lip on its radially surrounding outer periphery, it is in sealing contact with the housing wall when installed.

If the sealing lip is elastic, and the sealing lip's radially inner region is connected to the groove wall of the annular groove, which is remote from the housing wall, and the sealing lip's freely projecting radially outer region is inclined towards the housing wall, the retaining ring lies against the housing wall with preload, increasing the sealing effect when fitted to the housing wall.

BRIEF DESCRIPTION OF FIGURES

FIG. 1 shows a sealing grommet arrangement in longitudinal section.

One embodiment of the invention is shown in the drawing and is described in more detail below. The only FIGURE in the drawing shows a sealing grommet arrangement in longitudinal section.

The sealing grommet arrangement shown in the FIGURE has a sealing grommet 1 which is designed as a corrugated tube of constant diameter over its length with alternating corrugation troughs 2 and corrugation heights 3.

The sealing grommet is made of an elastic material.

At its left end, the sealing grommet 1 is provided with a tab 4 as a gripping contour, while at its right end it has a kinked connecting piece 5.

It is understood that the connecting piece 5 can have any other shape. For example, it can extend straight to the sealing grommet 1 or even be designed to bend flexibly in any direction.

In the left-hand end region of the sealing grommet 1, a retaining ring 6 is arranged with its central through-opening 7 in a corrugation trough 2, enclosing the sealing grommet 1 with the retaining ring's 6 inner contour 8. The retaining ring 6 rests with the inner contour 8 of its through-opening 7 against the sealing grommet 1 with preload on the outer contour of the corrugation trough 2.

In the left end region of the sealing grommet 1, the retaining ring 6 is shown in a state attached to a housing wall 10, while identical retaining rings 6' and 6" are shown in two other possible positions on the sealing grommet 1 on the right.

The retaining ring 6, 6', 6" has a radially surrounding, radially outwardly open annular groove 9 on its outer radially surrounding region, which has a groove width corresponding to the wall thickness of the housing wall 10.

At the bottom 11 of the annular groove 9, the annular groove 9 has a diameter corresponding to the diameter of an opening 12 in the housing wall 10. The retaining ring 6, 6', 6" is made of an elastic material and is positioned by latching over several corrugation heights 3 of the sealing grommet 1 on the sealing grommet 1. By engaging with its annular groove 9 in the opening 12 of the housing wall 10, the retaining ring 6 is secured to the housing wall 10 together with the sealing grommet 1.

On its radially outer periphery, the retaining ring 6, 6' 6" is provided with a radially surrounding sealing lip 13, the radially inner region 14 of the sealing lip 13 being connected to the groove wall 15 of the annular groove 9, which is remote from the housing wall 10. The freely projecting radially outer region 16 of the sealing lip 13 is inclined towards the housing wall 10 when it is not installed in the housing wall 10.

When the retaining ring 6 is installed in the housing wall 10, the sealing lip 13 is deformed outwards in a radial direction and lies against the housing wall 10 with a sealing preload.

LIST OF REFERENCE SYMBOLS

1 Sealing grommet
2 Corrugation troughs
3 Corrugation heights
4 Tab
5 Connecting piece
6 Retaining ring
7 Through-opening
8 Inner contour
9 Annular groove
10 Housing wall
11 Bottom
12 Opening
13 Sealing lip
14 Radially inner region
15 Groove wall
16 Radially outer region

The invention claimed is:

1. A sealing grommet arrangement having a sealing grommet which is designed as a corrugated tube of constant external diameter over its length and which projects with its one end through an opening in a housing wall and on which a retaining ring for retaining the sealing grommet on the housing wall is arranged, wherein the retaining ring can be connected to the housing wall so as to close the opening in the housing wall, wherein the retaining ring has a central through-opening with the inner contour of which the retaining ring projects into a corrugation trough of the sealing grommet, wherein the sealing grommet consists of an elastically deformable material such that the retaining ring can be moved elastically deforming the sealing grommet from one corrugation trough into an adjacent corrugation trough by applying a certain minimum axial force, wherein the retaining ring is provided on its outer radially surrounding region with a connecting structure which can be connected to the housing wall, wherein the connecting structure is a radially surrounding, radially outwardly open annular groove which has a groove width corresponding to the wall thickness of the housing wall and a diameter at the bottom of the annular groove corresponding to the diameter of the opening in the housing wall, wherein the retaining ring has a radially surrounding sealing lip on its radially surrounding outer periphery, wherein the sealing lip is elastic and connected with its radially inner region to a groove wall of the annular groove that is remote from the housing wall, wherein the sealing lip is inclined with its freely projecting radially outer region towards the housing wall when the retaining ring is not installed in the housing wall, and wherein the sealing lip is deformed outwards in a radial direction and lies against the housing wall with a sealing preload when the retaining ring is installed in the housing wall.

2. The sealing grommet arrangement according to claim 1, wherein the retaining ring is in contact with the inner contour of its through-opening in the corrugation trough of the sealing grommet.

3. The sealing grommet arrangement according to claim 2, wherein the through-opening of the retaining ring has a circular contour.

4. The sealing grommet arrangement according to claim 2, wherein the retaining ring bears with the inner contour of its through-opening with prestress against the outer contour of the corrugation trough.

5. The sealing grommet arrangement according to claim 1, wherein the sealing grommet has a gripping contour at one of its end regions, on which the sealing grommet can be gripped and axially force-loaded.

6. The sealing grommet arrangement according to claim 1, wherein the retaining ring consists of an elastically deformable material and can be latched with its annular groove into the opening of the housing wall.

* * * * *